3,591,549
REACTION PRODUCTS OF DIOCTYLTIN OXIDE AND DIOCTYLTIN MONOHYDRIC ALIPHATIC SATURATED ALCOHOL THIOGLYCOLATE ESTERS AND POLYVINYL CHLORIDE RESIN COMPOSITIONS STABILIZED THEREBY
Lawrence R. Brecker, Brooklyn, and Otto S. Kauder, Jamaica, N.Y., assignors to Argus Chemical Corporation, Brooklyn, N.Y.
No Drawing. Filed Jan. 3, 1969, Ser. No. 788,915
Int. Cl. C08f 45/62, 45/22
U.S. Cl. 260—45.75                                6 Claims

ABSTRACT OF THE DISCLOSURE

Dioctyltin oxide-dioctyltin monohydric aliphatic saturated alcohol thioglycolate ester reaction products are provided, which are particularly useful as stabilizers for polyvinyl chloride resins.

---

This invention relates to reaction products of dioctyltin oxide and dioctyltin monohydric aliphatic saturated alcohol thioglycolate esters, to polyvinyl chloride resin stabilizer compositions containing the same, and to polyvinyl chloride resin compositions having improved resistance to degradation by heat and by light, due to the presence of such reaction products.

Dialkyltin mercaptocarboxylic acid esters are widely used as stabilizers for polyvinyl chloride resins. They have, however, the disadvantage of a relatively high cost for the amount of tin provided per unit weight, and they may also impart an undesirable odor to the composition, as well as a slight yellow discoloration during the initial stages of heating. In order to obtain a high tin content in the resin, rather large amounts must be used, and since they are liquids, this may lower the softening temperature of the resin, which is particularly undesirable in rigid resin formulations.

Various modifications of the dialkyltin mercaptocarboxylic acid esters have been proposed. Canadian Pat. No. 794,373, dated Sept. 10, 1968, suggests that these can be reacted with organotin oxides or sulfides or hydrocarbyltin stannoic or thiostannoic acids, or esters. It is indicated that the diorganotin oxide or sulfide, stannoic acid or thiostannoic acid reacts with the carboxylic acid ester group, and that a minimum spacing between the —Sn—S— and the carboxylate groups is necessary, for reaction to take place, and that in fact the spacing alkylene group of the mercaptoacid must have a length of at least two carbon atoms. Thus, the alpha-mercaptocarboxylic acids, such as thioglycolic acid, are definitely excluded, with the result that the modification is of lesser commercial interest, inasmuch as it is the dialkyltin thioglycolate esters that are the widest used organotin mercaptocarboxylic acid esters commercially.

In accordance with the instant invention, it has been determined that dioctyltin oxide reacts with dioctyltin monohydric aliphatic saturated alcohol thioglycolate esters, forming a homogeneous liquid reaction product that is compatible with polyvinyl chloride resins, and that is a particularly effective polyvinyl chloride resin stabilizer, having many advantages compared to dioctyltin oxide, and to the dioctyltin monohydric aliphatic saturated alcohol thioglycolate ester starting materials. Unlike dioctyltin oxide, the reaction products of the invention are completely compatible with the polyvinyl chloride resins, and are liquids, despite the presence of up to 50% by weight of dioctyltin oxide based on the weight of the reaction product. Moreover, unlike the dioctyltin monohydric aliphatic saturated alcohol thioglycolate esters, the reaction products of the invention do not impart a yellow discoloration during the initial stages of the heating, and the long term stabilizing effectiveness, from the standpoint of inhibiting the development of significant color deterioration, is at least as great, timewise, as that of dioctyltin thioglycolates.

In addition to dioctyltin oxide, dioctyltin dichloride can be used, in the presence of alkali, such as sodium or potassium hydroxide, evidently because it forms dioctyltin oxide in situ, in the presence of the alkali. Consequently, reference to dioctyltin oxide will be understood to encompass dioctyltin dichloride and alkali. However, other dialkyltin oxides, such as dibutyltin oxide, do not give the reaction. The invention is, however, broadly applicable to the dioctyltin salts of monohydric aliphatic saturated alcohol thioglycolate esters, in which the aliphatic alcohol radical has from six to about eighteen carbon atoms. If the dioctyltin thioglycolate ester is not available, it is also possible to employ a mixture of the stoichiometrically equivalent amounts of the corresponding thioglycolate ester (2 moles) and dioctyltin oxide (1 mole), which react in situ to form the dioctyltin bis(thioglycolate ester). Esterifying alcohols which can be used with the thioglycolic acid in forming the thioglycolate esters accordingly include hexyl alcohol, isohexyl alcohol, heptyl alcohol, octyl alcohol, isooctyl alcohol, 2-ethylhexyl alcohol, decyl alcohol, nonyl alcohol, dodecyl alcohol, palmityl alcohol, and stearyl alcohol. The preferred alcohols have from eight to twelve carbon atoms, and the various octyl alcohols are especially preferred.

Any amount of dioctyltin oxide will improve the stabilizing effectiveness of the dioctyltin thioglycolate esters. For a significant improvement, the amount of dioctyltin oxide should be at least 2% by weight of the reaction product. There is no upper limit, except that imposed by homogeneity of the reaction product; in amounts in excess of about 50%, the homogeneity may be disadvantageously affected. The upper limit is reached when no more dialkyltin oxide dissolves. Preferred proportions are from 5 to 40% dioctyltin oxide by weight of the dioctyltin thioglycolate ester.

The reaction is very easily and rapidly carried out at from about 50 to about 250° C., and preferably at from about 100 to about 200° C. A solvent is not needed. The dioctyltin is insoluble in the dioctyltin thioglycolate ester, at the start, but dissolves therein as reaction proceeds. The reaction is complete when a homogeneous mixture is formed. If a suitable solvent is used, such as benzene, toluene, or xylene, the reaction of the dioctyltin oxide and dioctyltin thioglycolate ester can be effected under reflux. The reaction can be complete in as short a time as one-half hour, but reaction times of from three to five hours can be used. The solvent (if present) can be removed by vacuum stripping, and the resulting homogeneous liquid without further processing is then ready for use as a stabilizer for polyvinyl chloride resins.

The reaction products have an outstandingly high tin content, for dioctyltin mercaptoester derivatives. The tin content is within the range from about 12% to about 26% tin, depending on the amount of dioctyltin oxide reacted, preferably from 16 to 20% tin. Consequently, the reaction products are effective stabilizers in rather small amounts. From about 0.1 to about 10% reaction product by weight of the resin is generally used.

Any polyvinyl chlrodie resins having a major proportion of vinyl chloride up to 100% vinyl chloride are improved by these reaction products, such as, for example, polyvinyl chloride homopolymers, and copolymers of vinyl chloride with other copolymerizable monomers, such as vinyl acetate, vinylidene chloride, ethylene, methyl acrylate, acrylonitrile, propylene, and acrylic acid. The polyvinyl chloride resin compositions can include additional components, such as plasticizers, used in formulating semi-rigid and plasticized polyvinyl chloride resin compositions, the rigid compositions containing from 0 to 10% plasticizer, the semi-rigid compositions containing from 10 to 18% plasticizer, and highly plasticized compositions containing from 18 to 75% plasticizer. Other stabilizers, such as antioxidants, for example, phenols, can also be added.

The following example in the opinion of the inventors represents a preferred embodiment of the invention.

EXAMPLE 1

Dioctyltin oxide (18 parts) and dioctyltin-bis-diisooctyl thioglycolate (75 parts) were blended in a round bottom flask, and heated at 85° C. for three hours. The dioctyltin oxide slowly dissolved, and at the end of the reaction a homogeneous clear viscous liquid was recovered, containing 18.7% tin. This was employed without further processing as a stabilizer in the following resin composition:

| | Parts by weight |
|---|---|
| Diamond 40, polyvinyl chloride resin homopolymer | 100 |
| Blendex 401 (acrylonitrile-butadiene-styrene copolymer) | 10 |
| Wax E, lubricant | 0.25 |
| Stabilizer | Amount as shown in the table |

For comparison purposes, there was also used as a control stabilizer dioctyltin bis-isocyl thioglycolate, on an equal weight tin basis.

The ingredients were blended, and the resulting mixture was compounded and heated on a two-roll mill at 350° F. for five minutes, sheeted off, and cut into strips. The strips were placed in an air oven, heated at 350° or 375° F., and samples removed at fifteen minute intervals over a two hour period, and attached to cards. The appearance of the samples on the cards at 350° and 375° F. is noted in the tables below.

TABLE I.—350° F.

| Time (minutes) | Control [1] | Example 1 [2] |
|---|---|---|
| Initial | Colorless | Colorless. |
| 15 | do | Do. |
| 30 | Light yellow | Do. |
| 45 | do | Very pale yellow. |
| 60 | Yellow | Pale yellow. |
| 75 | do | Light yellow. |
| 90 | do | Do. |
| 105 | do | Do. |
| 120 | do | Do. |

[1] Dioctyltin-bis-isooctyl thioglycolate (15.85% Sn) (2 parts).
[2] Reaction product of dioctyltin oxide and dioctyltin-bis-isooctyl thioglycolate (18.7% Sn, 1.7 parts)

TABLE II.—350° F.

| Time (minutes) | Control [1] | Example 1 [2] |
|---|---|---|
| Initial | Colorless | Colorless. |
| 15 | Yellow | Very pale yellow. |
| 30 | do | Pale yellow. |
| 45 | do | Yellow. |
| 60 | do | Brown. |
| 75 | Brown | Do. |
| 90 | Dark brown | Dark brown. |

See footnotes [1] [2] Table I.

It is evident from the data that the dioctyltin oxide-dioctyltin-bis-isoctyl thioglycolate reaction product is superior in stabilizing effectiveness to the dioctyltin-bis-isooctyl thioglycolate. The reaction product shows no yellow discoloration in the initial stages of heating, and the long term stabilizing effectiveness is slightly enhanced. These results are obtained in an equal weight tin content, confirming that it is not tin content that is responsible for the improvement.

EXAMPLE 2

379 g. dioctyltin oxide (1.05 moles) was added slowly to 408 g. isooctylthioglycolate (2.0 moles), maintained at 50° C. over a period of two hours; then reduced pressure (18 mm.) was applied to remove the water formed by the reaction. The temperature rose to 65° C., and was kept there for one-half hour, also under reduced pressure. The product was a yellow liquid having a tin content of 16.3% and a sulfur content of 8.4%.

This product was compared to dioctyltin bis(isooctylthioglycolate) in the polyvinyl chloride resin composition of Example 2, and was found to give better early color when tested at 350° F.

EXAMPLE 3

Dioctyltin dichloride 62.4 g. (0.15 mole), isooctyl thioglycolate 40.8 g. (0.2 mole) and 100 ml. heptane were charged into a reaction vessel equipped with stirrer and cooling capacity. Sodium hydroxide 12.0 g. (0.3 mole) dissolved in 18 ml. water was slowly added to the mixture and the temperature maintained below 50° C. After the completion of NaOH addition, the reaction mixture was stirred for one hour, and the aqueous phase, removed. The organic phase was washed with 15 ml. of water, and the heptane was removed under vacuum. The product was a yellow liquid weighing 94 g.

This product was tested as stabilizer for rigid polyvinyl chloride resins in the same resin formulation of Example 1, and the results were equivalent to Example 1. The product gave improved early color, compared to the control, of equal tin contents.

Having regard to the foregoing disclosure, the following is claimed as the inventive and patentable embodiments thereof:

1. A polyvinyl chloride resin composition comprising a polyvinyl chloride resin and a homogeneous liquid reaction product containing from about 12% to about 26% tin that is compatible with polyvinyl chloride resins, and that is a particularly effective polyvinyl chloride resin stabilizer, comprising the product of the reaction at from about 50 to about 250° C. of dioctyltin oxide with a dioctyltin monohydric aliphatic saturated alcohol thioglycolate ester, in which the aliphatic alcohol radical has from six to about eighteen carbon atoms, the dioctyl tin oxide being in an amount of at least 2% up to about 50% by weight of the reaction product.

2. A polyvinyl chloride resin composition in accordance with claim 1 in which the polyvinyl chloride resin is a polyvinyl chloride homopolymer.

3. A rigid polyvinyl chloride resin composition according to claim 1 comprising up to 10% plasticizer.

4. A polyvinyl chloride resin composition according to claim 1 in which the amount of dioctyltin oxide is from 5% up to 40% by weight of the reaction product.

5. A polyvinyl resin composition in accordance with claim 1 in which the dioctyltin thioglycolate ester is an ester of an alcohol having from eight to twelve carbon atoms.

6. A polyvinyl chloride resin composition according to claim 1 in which the dioctyltin thioglycolate ester is a dioctyltin bis-(octylthioglycolate).

References Cited

UNITED STATES PATENTS

| 2,267,777 | 12/1941 | Yngue | 260—45.75 |
| 2,648,650 | 8/1953 | Weinberg | 260—45.75 |
| 3,478,071 | 11/1969 | Weisfield | 260—429.7 |

M. J. WELSH, Primary Examiner

V. P. HOKE, Assistant Examiner

U.S. Cl. X.R.

260—29.1, 45.95, 429.7

PO-1050
(5/69)

UNITED STATES PATENT OFFICE
CERTIFICATE OF CORRECTION

Patent No. 3,591,549      Dated July 6, 1971

Inventor(s) LAWRENCE R. BRECKER et al.

It is certified that error appears in the above-identified patent and that said Letters Patent are hereby corrected as shown below:

| | | |
|---|---|---|
| Column 2, line 46 | : | After "dioctyltin", add -- oxide -- |
| Column 2, line 66 | : | "chlrodie" should be -- chloride -- |
| Column 3, line 32 | : | "isoctyl" should be -- isooctyl -- |
| Column 3, line 68 | : | "isoctyl" should be -- isooctyl -- |

Signed and sealed this 11th day of April 1972.

(SEAL)
Attest:

EDWARD M. FLETCHER, JR.
Attesting Officer

ROBERT GOTTSCHALK
Commissioner of Patents